(12) United States Patent
Sasaki et al.

(10) Patent No.: US 11,368,830 B2
(45) Date of Patent: Jun. 21, 2022

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Akira Sasaki, Miyoshi (JP); Jun Hioki, Nagakute (JP); Kazuki Matsumoto, Oogaki (JP); Fumio Wada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/854,052

(22) Filed: Apr. 21, 2020

(65) Prior Publication Data

US 2021/0014658 A1  Jan. 14, 2021

(30) Foreign Application Priority Data

Jul. 11, 2019  (JP) .............................. JP2019-129385

(51) Int. Cl.
| | |
|---|---|
| *H04W 4/80* | (2018.01) |
| *H04W 4/02* | (2018.01) |
| *H04W 4/44* | (2018.01) |
| *G08G 1/0967* | (2006.01) |

(52) U.S. Cl.
CPC ........ *H04W 4/80* (2018.02); *G08G 1/096716* (2013.01); *G08G 1/096741* (2013.01); *G08G 1/096775* (2013.01); *G08G 1/096791* (2013.01); *H04W 4/027* (2013.01); *H04W 4/44* (2018.02)

(58) Field of Classification Search
CPC ....... G08G 1/096716; G08G 1/096741; G08G 1/096775; G08G 1/096791; H02H 1/0007; H02H 7/268; H02H 9/02; H02J 1/082; H04W 4/027; H04W 4/44; H04W 4/80
USPC ........................... 455/456.3; 701/36, 48, 431
See application file for complete search history.

(56) References Cited

U.S. PATENT DOCUMENTS

| | | | | |
|---|---|---|---|---|
| 2005/0170848 A1* | 8/2005 | Sato | ........................ | H04W 4/02 455/456.3 |
| 2005/0240344 A1* | 10/2005 | Tomita | .................. | G01C 21/34 701/431 |
| 2014/0081517 A1* | 3/2014 | Barrett | .................. | B60K 35/00 701/36 |

(Continued)

FOREIGN PATENT DOCUMENTS

| | | |
|---|---|---|
| JP | 2006-182234 A | 7/2006 |
| JP | 2019-074853 A | 5/2019 |

*Primary Examiner* — Tan H Trinh
(74) *Attorney, Agent, or Firm* — Oliff PLC

(57) ABSTRACT

An information processing device includes a controller configured to acquire information relating to a current position of a terminal from the terminal, transmit first content data to the terminal when the current position of the terminal is within a communication range of first wireless communication, and transmit second content data, which has a data size transmittable within a predetermined time even though second wireless communication having a speed lower than the first wireless communication, transfers information with the same effect as a content of the first content data, and is different in transfer method of the content from the first content data, to the terminal when the current position of the terminal is outside the communication range of the first wireless communication.

5 Claims, 5 Drawing Sheets

(56) References Cited

U.S. PATENT DOCUMENTS

| | | | |
|---|---|---|---|
| 2015/0149042 A1* | 5/2015 | Cooper | H04W 4/48 |
| | | | 701/48 |
| 2017/0184407 A1* | 6/2017 | Yamashiro | G01C 21/28 |
| 2018/0310158 A1* | 10/2018 | Kimura | H04W 48/18 |
| 2019/0116462 A1* | 4/2019 | Sagesaka | G07B 15/063 |

* cited by examiner

EXAMPLE OF FIELD INTENSITY MAP

EXAMPLE OF DATA STRUCTURE OF CONTENT DB

|  | RICH DATA | LEAN DATA |
|---|---|---|
| TARGET #1 | MOVING IMAGE FILE A | IMAGE SLIDE FILE B |
| TARGET #2 | MOVING IMAGE FILE C | SOUND FILE D |
| ⋮ | ⋮ | ⋮ |

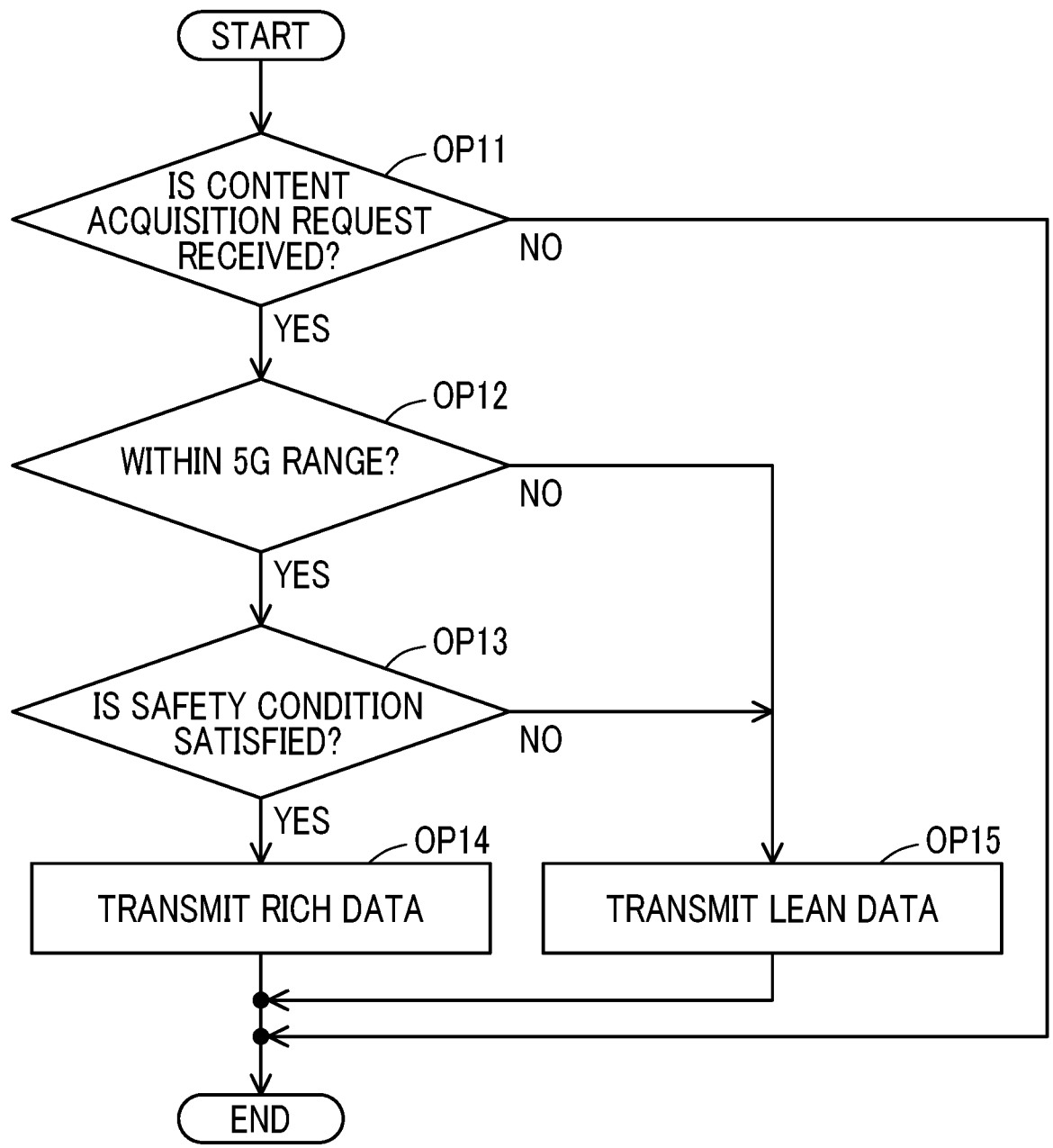

INFORMATION PROCESSING DEVICE AND INFORMATION PROCESSING METHOD

INCORPORATION BY REFERENCE

The disclosure of Japanese Patent Application No. 2019-129385 filed on Jul. 11, 2019 including the specification, drawings and abstract is incorporated herein by reference in its entirety.

BACKGROUND

1. Technical Field

The present disclosure relates to an information processing device and an information processing method.

2. Description of Related Art

Mobile wireless communication has become higher speed and larger capacity communication over generations. Thus, for example, a large amount of data can be provided to an in-vehicle device or a mobile terminal, such as a smartphone, through the mobile wireless communication.

SUMMARY

However, for example, new generation mobile wireless communication, such as 5th Generation (5G), has a characteristic that straightness of radio waves is high in order to implement high-speed and large capacity wireless communication. Thus, for example, there is a possibility that an area where radio waves do not reach, such as shadow of a building, occurs. Accordingly, for example, when the in-vehicle device or the mobile terminal transmits or receives a large amount of data while moving through communication of 5G, in a case where the in-vehicle device or the mobile terminal enters an area where radio waves of 5G do not reach, the transmission or reception may be interrupted, and communication of 5G may become unstable. Accordingly, information may not be appropriately provided to a user who is moving.

An aspect of the present disclosure provides an information processing device and an information processing method capable of stably distributing contents to a mobile terminal in wireless communication.

A first aspect of the disclosure relates to an information processing device. The information processing device includes a controller. The controller is configured to acquire information relating to a current position of a terminal from the terminal, transmit first content data to the terminal when the current position of the terminal is within a communication range of first wireless communication, and transmit second content data, which has a data size transmittable within a predetermined time even though second wireless communication having a speed lower than the first wireless communication, transfers information with the same effect as a content of the first content data, and is different in transfer method of the content from the first content data, to the terminal when the current position of the terminal is outside the communication range of the first wireless communication.

A second aspect of the disclosure relates to an information processing method. The information processing method includes acquiring information relating to a current position of a terminal from the terminal, transmitting first content data to the terminal when the current position of the terminal is within a communication range of first wireless communication, and transmit second content data, which has a data size transmittable within a predetermined time even though second wireless communication having a speed lower than the first wireless communication, transfers information with the same effect as a content of the first content data, and is different in transfer method of the content from the first content data, to the terminal when the current position of the terminal is outside the communication range of the first wireless communication.

According to the aspects of the disclosure, it is possible to stably distribute contents to a mobile terminal in wireless communication.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is an example of a flowchart of content distribution processing of the center server.

DETAILED DESCRIPTION OF EMBODIMENTS

Figure 1:
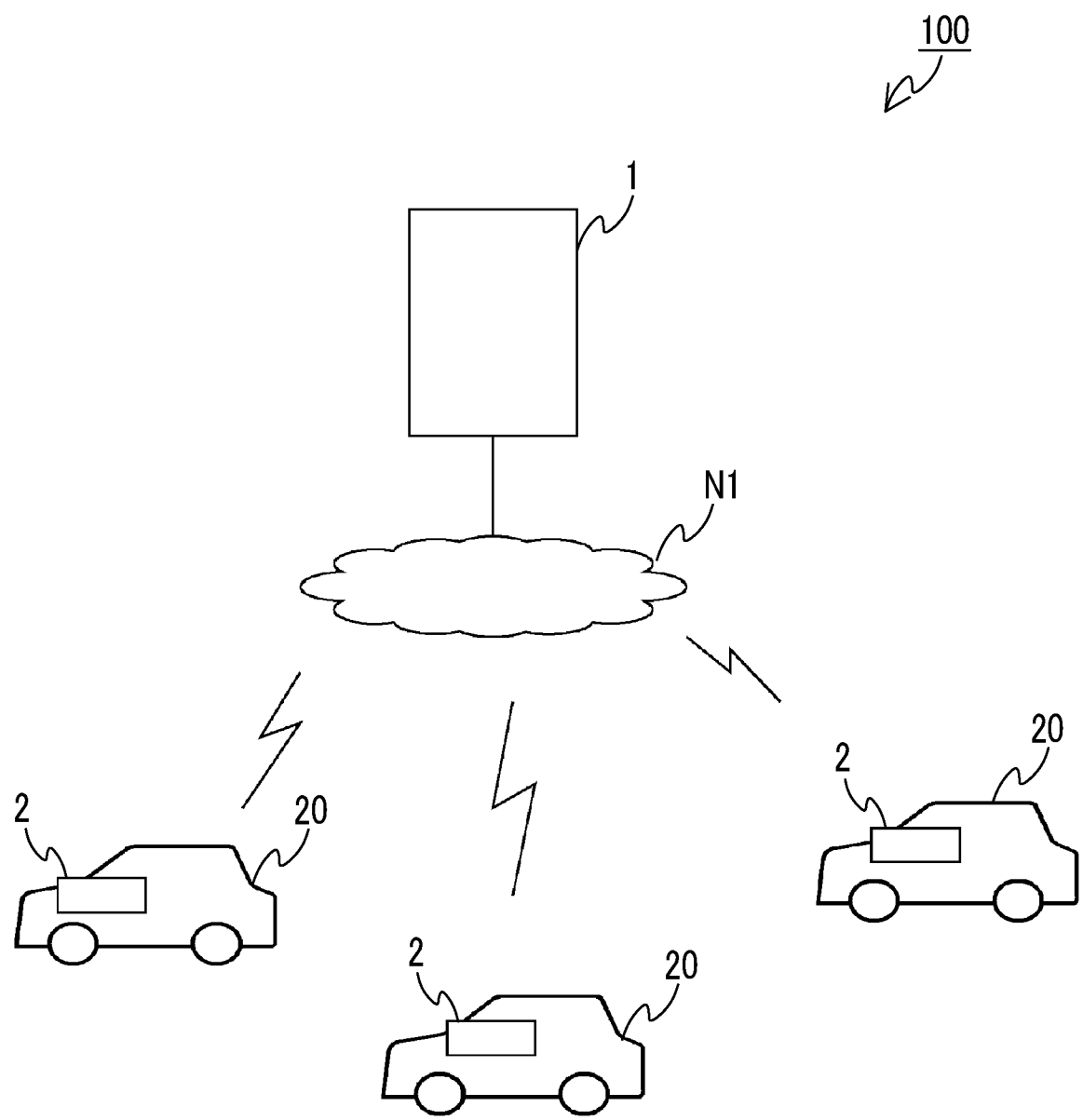
FIG. 1 is a diagram showing an example of the system configuration of a content distribution system according to first embodiment.

An aspect of the disclosure relates to an information processing device. The information processing device includes a controller. The controller is configured to acquire information relating to a current position of a terminal from the terminal, transmit first content data to the terminal when the current position of the terminal is within a communication range of first wireless communication, and transmit second content data, which has a data size transmittable within a predetermined time even though second wireless communication having a speed lower than the first wireless communication, transfers information with the same effect as a content of the first content data, and is different in transfer method of the content from the first content data, to the terminal when the current position of the terminal is outside the communication range of the first wireless communication. The second wireless communication is a wireless communication system having a speed lower than the first wireless communication. The second content data is content data that has a data size transmittable within the predetermined time even though the second wireless communication having a speed lower than the first wireless communication, and has the same effect as the content of the first content data but is different in the transfer method of the content from the first content data. For example, the first content data is moving image data, and the second content data is still image data.

For example, when the first wireless communication is 5G, the second wireless communication is one of 4G, Long Term Evolution (LTE), 3G, and the like. However, the first wireless communication and the second wireless communication are not limited thereto. The content is, for example, data describing an operation method of a predetermined device, a description or an introduction of a predetermined store or facility, or the like. The transfer method of the content includes, for example, a moving image (movement), a still image (picture), sound, a character, or the like. The terminal is, for example, an in-vehicle device, a smartphone, a tablet terminal, a wearable terminal, a notebook PC, or the like. The data size transmittable within the predetermined time even though the second wireless communication may be, for example, a data size smaller than the first content data. The predetermined time is, for example, a time to an extent needed when the first content data is transmitted to the terminal through the first wireless communication.

According to the aspect of the disclosure, a transfer method and a size of a content of content data to be distributed to the terminal change according to whether or not the terminal is positioned within the communication range of the first wireless communication. For example, when the terminal is positioned outside the communication range of the first wireless communication, the second content data of a size transmittable within the predetermined time even though the lower speed second wireless communication is transmitted to the terminal. Since the contents of the first content data and the second content data have the same effect, a user of the terminal can substantially acquire the same information from the first content data and the second content data. Thus, for example, even though the terminal is positioned outside the communication range of the first wireless communication, it is possible to stably provide the user with information equivalent to the first content data while restraining the distribution of the content from being interrupted.

In one aspect of the disclosure, the controller may transmit the first content data to the terminal when the terminal is positioned within the communication range of the first wireless communication and a safety condition is satisfied. The safety condition may include a condition that the terminal is not moving or a condition that a vehicle, in which the terminal is mounted, is during autonomous driving. However, the safety condition is not limited thereto.

The first content data is, for example, moving image data, a slide of still image data, or the like, and in this case, the second content data is, for example, sound data, character data, or the like. The first content data is rich in transfer methods, and thus, more easily attracts attention of the user of the terminal than the second content data. In a case where a first content is distributed while the terminal is moving, the user pays attention to the terminal, and there is a possibility that the user is exposed in a dangerous state. Even though the terminal is positioned within the communication range of the first wireless communication system, when the safety condition is not satisfied, the second content data is transmitted to the terminal, whereby it is possible to protect the safety of the user of the terminal.

Hereinafter, an embodiment of the disclosure will be described referring to the drawings. The configuration of the following embodiment is illustrative, and the disclosure is not limited to the configuration of the embodiment.

First Embodiment

FIG. 1 is a diagram showing an example of the system configuration of a content distribution system 100 according to a first embodiment. The content distribution system 100 is, for example, a system that distributes rich content data or lean content data according to a communication range of a wireless communication system where a terminal as a request source of a content is positioned.

Rich content data is data for which a plurality of transfer methods of the content is used, and thus, of which the size is comparatively large. On the other hand, lean content data is data for which one or a plurality of transfer methods smaller than rich content data is used, and thus, of which the size is smaller than rich content data. In other words, for a content with the same effect, rich content data is data that is rich in modifications, and lean content data is data in which modifications are removed. Rich content data is an example of "first content data". Lean content data is an example of "second content data".

The transfer method of the content includes, for example, a moving image (movement), a still image (picture), sound, a character, or the like. However, the transfer method is not limited thereto. Decision regarding whether content data is rich or lean may be relatively made. For example, for a certain content, when there are moving image data and still image data representing the content, between moving image data and still image data, moving image data becomes rich data, and still image data becomes lean data. For example, for a certain content, when there are slide data constituted of a plurality of pieces of still image data and single still image data representing the content, between slide data and single still image data, slide data becomes rich data, and single still image data becomes lean data. For example, for a certain content, when there are moving image data with sound and motion data with no sound representing content data, between moving image data and motion data, moving image data with sound is rich content data, and motion data with no sound becomes lean data. Hereinafter, rich content data is also referred to as rich data, and lean content data is also referred to as lean data.

The content distribution system 100 includes, for example, a center server 1, and an in-vehicle device 2 that is mounted in each of a plurality of vehicles 20. The vehicle 20 may be, for example, one of a manual driving vehicle and an autonomous driving vehicle. The in-vehicle device 2 may be, for example, one of a data communication device, an in-vehicle device of a car navigation system, and a control device that controls autonomous driving when the vehicle 20 is an autonomous driving vehicle. The in-vehicle device 2 is connected to, for example, a public network N1, such as the Internet, using one of mobile communication, such as 5G, 4G, or Long Term Evolution (LTE), and narrowband communication, such as Dedicated Short Range Communications (DSRC).

The center server 1 is connected to, for example, the network N1, such as the Internet. The center server 1 and each in-vehicle device 2 can perform communication through the network N1.

For example, communication using 5G has a communication speed of 10 Gbps, and can transmit and receive a large amount of data in a shorter time. On the other hand, since communication using 5G has high directivity, radio waves may not reach a portion to be a shadow of an obstacle, such as a building, even within a cover area. That is, in 5G, there is a possibility that unconnectable areas are scattered because radio waves do not reach. Communication using 5G is an example of "first wireless communication". Communication using a wireless communication system having a speed lower than 5G is an example of "second wireless communication".

For example, when the vehicle 20 attempts to download rich content data, such as large-size moving image data, with the in-vehicle device 2 during traveling, in a case where the vehicle 20 enters an area where radio waves of 5G do not reach, communication of 5G is disconnected, the download is interrupted, or time is needed, and there is a high possibility that a comfortable communication environment cannot be provided. Accordingly, in the first embodiment, the center server 1 has, for example, map information of the distribution of field intensity of 5G, and distributes rich content data or lean content data to the in-vehicle device 2 according to whether or not the vehicle 20 is positioned within a communication range of 5G based on the map information. Hereinafter, the map information of the distribution of field intensity is referred to as a field intensity map. For example, a field intensity map provided from a communication carrier is stored in advance. However, the disclosure is not limited thereto, and the field intensity map may be generated based on positional information transmitted from each in-vehicle device 2 in a predetermined cycle and a measurement result of field intensity at the position.

In the first embodiment, the center server 1 transmits rich content data or lean content data according to whether or not the in-vehicle device 2 is positioned within the communication range of 5G based on the field intensity map in response to a request from the in-vehicle device 2. Specifically, for example, in a case where a certain facility is selected by the user from a map displayed on a display device connected to the in-vehicle device 2 in the vehicle 20, the in-vehicle device 2 transmits a request for a content relating to the facility to the center server 1. The center server 1 transmits rich data of the content relating to the facility to the in-vehicle device 2 when the in-vehicle device 2 is positioned within the communication range of 5G. The center server 1 transmits lean data of the content relating to the facility to the in-vehicle device 2 when the in-vehicle device 2 is positioned outside the communication range of 5G.

Thus, for example, when the in-vehicle device 2 is positioned within a communication range of 4G, lean content data is transmitted, whereby it is possible to suppress interruption of communication during the distribution of the content, and to provide stable communication.

Figure 2:
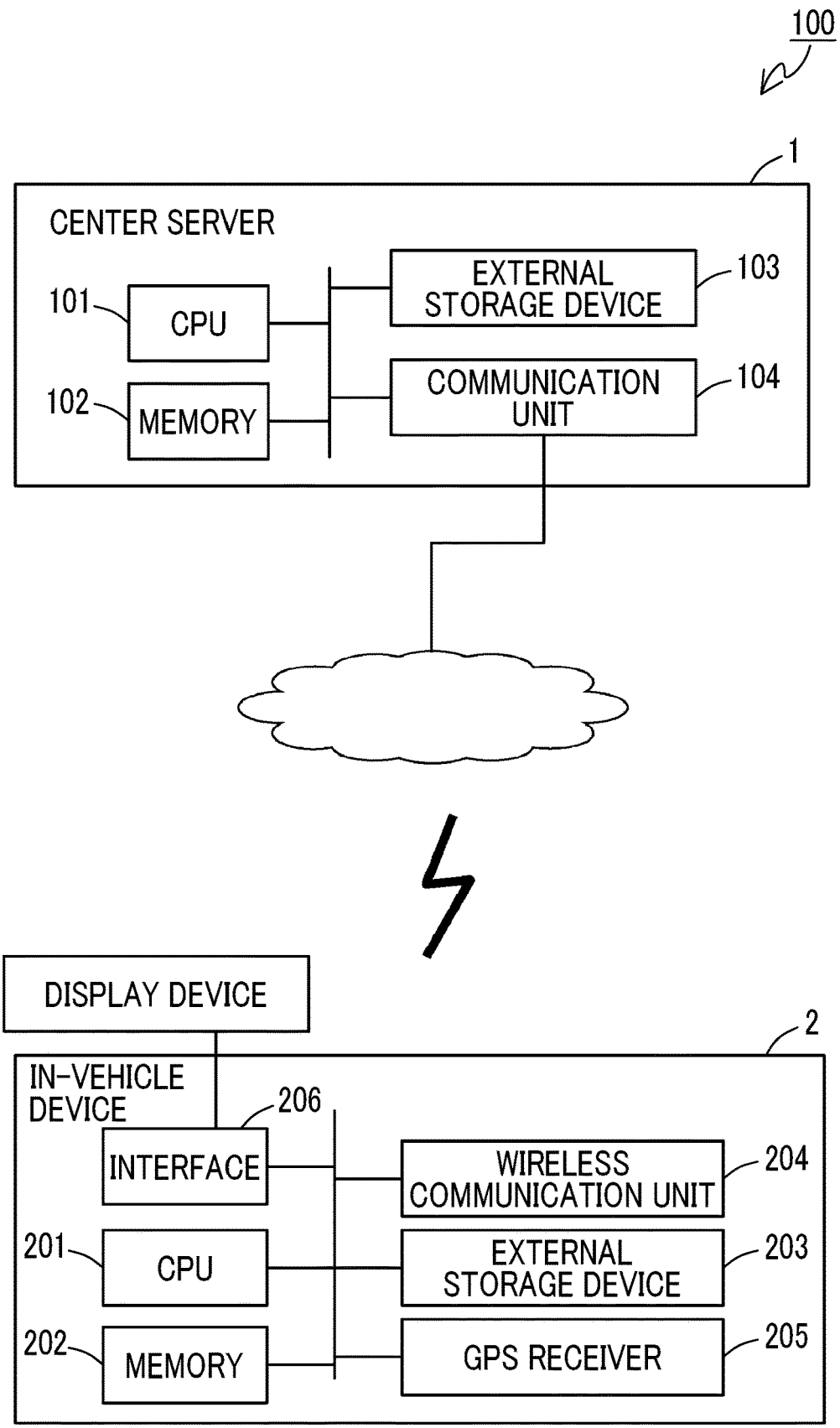
FIG. 2 is a diagram showing an example of the hardware configuration of a center server and an in-vehicle device in the content distribution system.

FIG. 2 is a diagram showing an example of the hardware configuration of the center server 1 and the in-vehicle device 2 in the content distribution system 100. The center server 1 is, for example, a dedicated computer or a general-purpose computer. The center server 1 has, as hardware components, a central processing unit (CPU) 101, a memory 102, an external storage device 103, and a communication unit 104. The memory 102 and the external storage device 103 are computer-readable recording mediums. The center server 1 is an example of an "information processing device".

The external storage device 103 stores various programs or data that is used by the CPU 101 in executing each program. The external storage device 103 is, for example, an erasable programmable ROM (EPROM) or a hard disk drive. The programs stored in the external storage device 103 include, for example, an operating system (OS), a control program of the content distribution system 100, and various other application programs. The control program of the content distribution system 100 is a program that distributes content data relating to a target requested by the in-vehicle device 2.

The memory 102 is a storage device that provides the CPU 101 with a storage area and a work area for loading the programs stored in the external storage device 103 or is used as a buffer. The memory 102 includes, for example, a semiconductor memory, such as a read only memory (ROM) or a random access memory (RAM).

The CPU 101 loads the OS or various application programs stored in the external storage device 103 on the memory 102 and executes the OS or various application programs to execute various kinds of processing. The number of CPUs 101 is not limited to one, and a plurality of CPUs 101 may be provided. The CPU 101 is an example of a "controller" of an "information processing device".

The communication unit 104 is an interface that inputs and outputs information to and from the network. The communication unit 104 may be an interface that is connected to a wired network or may be an interface that is connected to a wireless network. The communication unit 104 is, for example, a network interface card (NIC), a wireless circuit, or the like. The communication unit 104 is connected to, for example, a local area network (LAN), is connected to a public network through the LAN, and performs communication with various servers on the network and the in-vehicle device 2 through the public network.

Next, the in-vehicle device 2 is, for example, a data communication device mounted in the vehicle 20, a car navigation device, an ETC in-vehicle device, or the like. When the vehicle is an autonomous driving vehicle, the in-vehicle device 2 may be a control device of autonomous driving including a communication function for connection to a public network, such as the Internet. It should be noted that the in-vehicle device 2 is not limited thereto. For example, the in-vehicle device 2 may be a portable terminal, such as a smartphone, a tablet terminal, or a wearable terminal, which is carried with a user who boards the vehicle 20. Hereinafter, in the first embodiment, description will be provided assuming that the in-vehicle device 2 is the data communication device mounted in the vehicle 20.

The in-vehicle device 2 includes, as hardware components, for example, a CPU 201, a memory 202, an external storage device 203, a wireless communication unit 204, a Global Positioning System (GPS) receiver 205, and an interface 206. The CPU 201, the memory 202, and the external storage device 203 are the same as the CPU 101, the memory 102, and the external storage device 103. However, in the external storage device 203 of the in-vehicle device 2, for example, a control program for the in-vehicle device of the content distribution system 100 and a navigation application are stored. The control program for the in-vehicle device of the content distribution system 100 is, for example, a program that transmits a request for content data relating to a target designated by the user to the center server 1 and acquires content data. The navigation application is an application that acquires a route to a designated destination and performs route guidance.

The wireless communication unit 204 is, for example, a mobile communication circuit, such as 5G, LTE, or LTE-Advanced (4G), or a wireless communication circuit, such as WiFi or DSRC. The wireless communication unit 204 is connected to an access network according to a corresponding wireless communication system through wireless communication, is connected to a public network through the access network, and is connected to the center server 1 and the like through the public network. In the first embodiment, the wireless communication unit 204 is a wireless circuit for mobile communication, and selects a network to be used in order of priority of 5G>4G>3G.

The GPS receiver 205 receives radio waves of a time signal from a plurality of artificial satellites that orbits around the earth, and stores the signal in a register provided in the CPU 201. The CPU 201 calculates a latitude and a longitude as a position on the earth based on a detection signal from the GPS receiver 205 to acquire positional information of the vehicle 20 (in-vehicle device 2).

The interface 206 is, for example, an interface for connection to the display device provided in the vehicle 20. The interface 206 may be connected directly connected to the display device provided in the vehicle 20 by a cable or the like or may be connected to an in-vehicle network (controller area network (CAN)) and may be connected to the display device provided in the vehicle 20 through the CAN. The display device provided in the vehicle 20 connected to the in-vehicle device 2 is, for example, one or more of a display device of a car navigation system, a display device provided toward a rear seat, and the like. The display device provided in the vehicle 20 connected to the in-vehicle device 2 may include a touch panel and may also have a function of an input device.

The hardware configuration of the center server 1 and the in-vehicle device 2 shown in FIG. 2 is an example and is not limited to the above-described configuration, and components can be suitably omitted, replaced, or added according to the embodiment. For example, the center server 1 may include a portable recording medium drive device and may execute a program recorded on a portable recording medium. The portable recording medium is, for example, a recording medium, such as an SD card, a mini SD card, a micro SD card, a universal serial bus (USB) flash memory, a compact disc (CD), a digital versatile disc (DVD), a Blu-ray (Registered Trademark) Disc, or a flash memory card. Furthermore, for example, the center server 1 may include an input device and an output device. The input device is, for example, a keyboard, a mouse, a touch panel, or the like. The output device is, for example, a display or the like.

A series of processing that is executed by the center server 1 and the in-vehicle device 2 is not limited as being achieved by a processor executing software, and may be achieved by hardware, such as a field-programmable gate array (FPGA).

Figure 3:
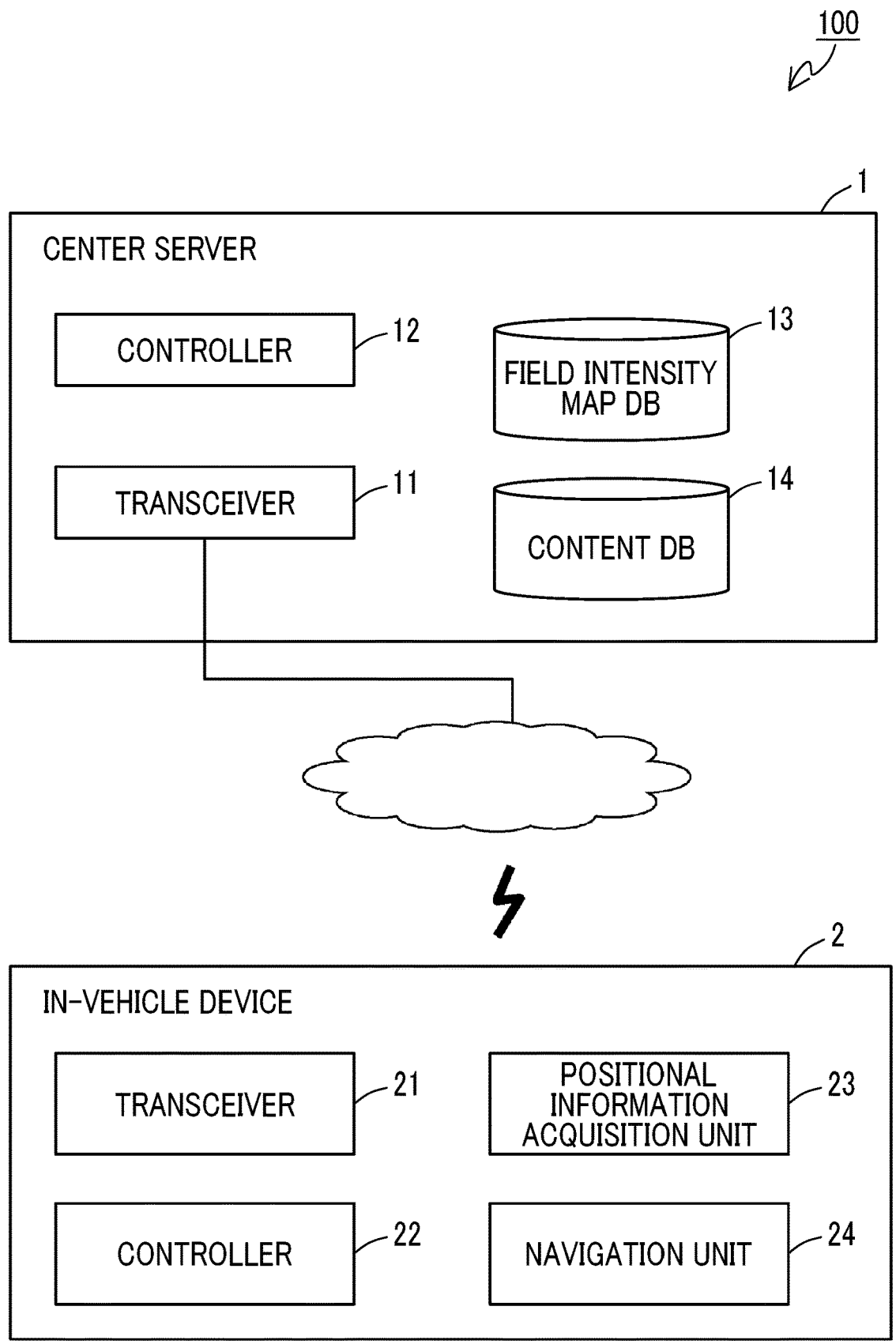
FIG. 3 is a diagram showing an example of the functional configuration of the center server and the in-vehicle device in the content distribution system.

FIG. 3 is a diagram showing an example of the functional configuration of the center server and the in-vehicle device in the content distribution system 100. The in-vehicle device 2 includes, as functional components, transceiver 21, a controller 22, a positional information acquisition unit 23, and a navigation unit 24. The controller 22 is achieved by, for example, the CPU 201 of the in-vehicle device 2 executing the control program for the in-vehicle device 2 of the content distribution system 100 stored in the external storage device 203. The navigation unit 24 is achieved by, for example, the CPU 201 of the in-vehicle device 2 executing the navigation application stored in the external storage device 203. The transceiver 21 and the positional information acquisition unit 23 are achieved by, for example, the OS.

The transceiver 21 is an interface for communication with the network to be performed through the wireless communication unit 204. The transceiver 21 receives, for example, an input of an acquisition request for content data relating to the target designated by the user from the controller 22 and transmits the acquisition request to the center server 1 through the wireless communication unit 204. The transceiver 21 receives content data relating to the target designated by the user from the center server 1 through the wireless communication unit 204 and outputs content data to the controller 22.

The positional information acquisition unit 23 acquires, for example, the positional information of the vehicle 20 (in-vehicle device 2) acquired by the GPS receiver 205 of the in-vehicle device 2 in a predetermined cycle and outputs, for example, the positional information to a predetermined storage area of the memory 202. In the storage area of the memory 202, the positional information is updated by, for example, an overwriting method. The controller 22 and the navigation unit 24 access the storage area of the memory 202 and acquire the positional information. The positional information of the vehicle 20 is, for example, the latitude and the longitude. Alternatively, the positional information of the vehicle 20 may be, for example, an address. The cycle in which the positional information acquisition unit 23 acquires the positional information may be set, for example, in a range of 0.1 seconds to 10 seconds. However, the disclosure is not limited thereto.

The navigation unit 24 performs control relating to the route guidance. In the in-vehicle device 2, the navigation unit 24 and the controller 22, that is, the navigation application and the control program for the in-vehicle device 2 of the content distribution system 100 are linked by, for example, an API. While the navigation application is operating in the foreground of the in-vehicle device 2, the control program for the in-vehicle device 2 of the content distribution system 100 is operating in the background of the in-vehicle device 2. However, the disclosure is not limited thereto, and the control program for the in-vehicle device 2 of the content distribution system 100 may be a part of the navigation application.

The navigation unit 24 receives, for example, an input of an instruction to start a route search from the user, acquires the route to the destination from a server for a route search, and performs the route guidance based on the positional information. Furthermore, in a case where the acquisition request for the content relating to the target is input from the user, the navigation unit 24 outputs the request to the controller 22. The content relating to the target is, for example, an introduction relating to a facility, a store, or the like included in the map displayed on the display device, a description of a use method of the in-vehicle device 2 or a device designated by another user, or the like. However, the content relating to the target is not limited thereto.

The controller 22 performs control relating to the acquisition of the content. In a case where an input of the acquisition request for the content relating to the target is received from the navigation unit 24, the controller 22 transmits the acquisition request to the center server 1 through the transceiver 21. Identification information of the target and the positional information of the in-vehicle device 2 are input from the navigation unit 24 along with the acquisition request. The identification information of the target and the positional information of the in-vehicle device 2 are also transmitted to the center server 1. Information relating to a driving status of the vehicle 20 is also transmitted to the center server 1 along with the acquisition request. Information relating to the driving status of the vehicle 20 is, for example, information indicating that the vehicle 20 is traveling or stopped. When the vehicle 20 is a vehicle that can perform autonomous driving, information relating to the driving status of the vehicle 20 may include, for example, information indicating whether the vehicle 20 is during autonomous driving or during manual driving. The controller 22 acquires information relating to the driving status of the vehicle 20 from, for example, a sensor mounted in the vehicle 20.

The controller 22 receives content data relating to the target as a response to the acquisition request for the content relating to the target from the center server 1 through the transceiver 21. The controller 22 outputs received content data to, for example, the navigation unit 24.

The controller 22 may transmit the positional information of the vehicle 20 and a measurement result of the field intensity of 5G to the center server 1 through the transceiver 21 in a predetermined cycle in order for big data collection of the center server 1.

Next, the center server 1 includes, as functional components, a transceiver 11, a controller 12, a field intensity map database (DB) 13, and a content DB 14. The functional components are achieved by, for example, the CPU 101 of the center server 1 executing a control program for the center server 1 of the content distribution system 100 stored in the external storage device 103.

The transceiver 11 controls communication with the in-vehicle device 2 to be performed through the communication unit 104. For example, in a case where the acquisition request for content data relating to the target is received from the in-vehicle device 2, the transceiver 11 outputs the acquisition request to the controller 12.

The controller 12 receives an input of the acquisition request for content data relating to the target from the transceiver 11. For example, the identification information of the target, the positional information of the in-vehicle device 2, and information relating to the driving status of the vehicle 20 are also received along with the acquisition request for content data relating to the target. In a case where the acquisition request for content data relating to the target is received, the controller 12 determines whether or not the in-vehicle device 2 is within the communication range of 5G with reference to the field intensity map DB 13 described below. Furthermore, the controller 12 determines whether or not a safety condition is satisfied regarding the driving status of the vehicle 20, in which the in-vehicle device 2 is mounted, based on information relating to the driving status of the vehicle 20. The safety condition is a condition for restraining the user on the vehicle 20, in which the in-vehicle device 2 is mounted, from being exposed to danger due to the distribution of content data. The safety condition is, for example, a condition that the vehicle 20, in which the in-vehicle device 2 is mounted, is stopped, a condition that the vehicle 20 is during autonomous driving when the vehicle 20 is a vehicle that can perform autonomous driving, or the like.

When the in-vehicle device 2 is within the communication range of 5G, and the safety condition is satisfied regarding the in-vehicle device 2, the controller 12 transmits rich data corresponding to the content of the target to the in-vehicle device 2. When the in-vehicle device 2 is outside the communication range of 5G or when the safety condition is not satisfied regarding the in-vehicle device 2, the controller 12 transmits lean data corresponding to the content of the target.

Each of the field intensity map DB 13 and the content DB 14 is created in the storage area of the external storage device 103 of the center server 1. Details of the field intensity map DB 13 and the content DB 14 will be described below.

The functional components of the center server 1 may be achieved by processing in different devices. For example, the field intensity map DB 13 and the content DB 14 may be stored in an external server.

Figures 4, 5:
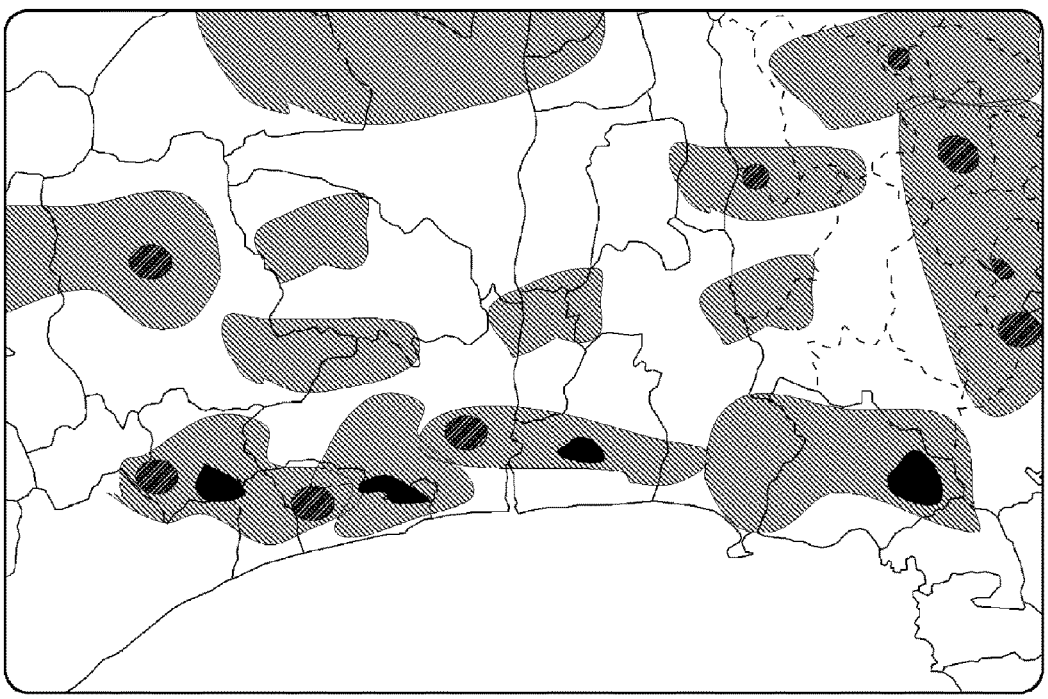
FIG. 4 is a diagram showing an example of a field intensity map.
FIG. 5 is a diagram showing an example of the data structure of a content DB.

FIG. 4 is a diagram showing an example of the field intensity map. The field intensity map is stored in the field intensity map DB 13. The field intensity map shown in FIG. 4 indicates the distribution of field intensity of 5G of a part of an area that is controlled by the center server 1. In FIG. 4, an area where the field intensity of 5G is equal to or higher than a first threshold value is shaded. The first threshold value of the field intensity is, for example, minimum field intensity that is needed for stably performing communication of 5G. In FIG. 4, an area where the field intensity is equal to or higher than a second threshold value is most darkened. The second threshold value of the field intensity is a value equal to or greater than the first threshold value.

The field intensity map may be created by, for example, a carrier. In this case, the field intensity map is prepared for each carrier. For example, identification information of a carrier that is used by the in-vehicle device 2 is also received along with the acquisition request for the content relating to the target.

Alternatively, the field intensity map may be created based on big data from a terminal, such as the in-vehicle device 2. In this case, for example, when the positional information and the measurement result of the field intensity are received from the in-vehicle device 2, the controller 12 performs plotting at a position of the field intensity map corresponding to the positional information. The type of the plot differs in a stepwise manner, for example, according to the measurement result of the field intensity. In a case where plotting is performed based on information from the in-vehicle device 2 in this way, the distribution of field intensity of 5G becomes clear as shown in FIG. 4. Plotting of information for which a predetermined time has elapsed from the reception may be deleted from the field intensity map. Thus, it is possible to store the field intensity map as being close to a present state.

In the field intensity map, not only the distribution of field intensity of 5G, but also the distribution of field intensity of another wireless communication system, such as 4G or 3G, may be included. Alternatively, the field intensity map may be facilitated according to each wireless communication system. The field intensity map shown in FIG. 4 is an example, and the field intensity map may be stored in any form as long as the distribution of field intensity is shown.

FIG. 5 is a diagram showing an example of the data structure of the content DB 14. The content DB 14 is a database that stores content data relating to each target. In the content DB 14, rich data and lean data are stored for each target. Furthermore, identification information of each target and identification information of rich data and lean data are associated with each other. The identification information of rich data and lean data is, for example, a file name, an identification number, or the like. In the example shown in FIG. 5, rich data of a target #1 is a moving image file A, and lean data is an image slide file B. In the example shown in FIG. 5, rich data of a target #2 is a moving image file C, and lean data is a sound file D. The data structure of the content DB 14 is not limited to the example shown in FIG. 5.

Flow of Processing

FIG. 6 is an example of a flowchart of content distribution processing of the center server 1. The processing shown in FIG. 6 is repeatedly executed in a predetermined cycle while the center server 1 is in operation. Although an execution subject of the processing shown in FIG. 6 is the CPU 101, in FIG. 6, for convenience, description will be provided taking the functional components as the subject.

In OP11, the controller 12 determines whether or not the acquisition request for the content relating to the target is received from the in-vehicle device 2 through the transceiver 11. When the acquisition request for the content relating to the target is received from the in-vehicle device 2 (OP11: YES), the process progresses to OP12. When the acquisition request for the content relating to the target is not received from the in-vehicle device 2 (OP11: NO), the processing shown in FIG. 6 ends. The reception of the acquisition request for the content relating to the target from the in-vehicle device 2 refers to, for example, a case where the acquisition request for the content relating to the target is input by the user on the vehicle in which the in-vehicle device 2 is mounted. For example, the identification information of the target, the positional information of the in-vehicle device 2, and information relating to the driving status of the vehicle 20 are also received along with the acquisition request for the content relating to the target.

In OP12, the controller 12 determines whether or not the in-vehicle device 2 is positioned within the communication range of 5G. The determination is performed, for example, according to whether the position indicated by the positional information of the in-vehicle device 2 is included within an area where the field intensity shown in the field intensity map of 5G is equal to or higher than the first threshold value. When the in-vehicle device 2 is positioned within the communication range of 5G (OP12: YES), the process progresses to OP13. When the in-vehicle device 2 is positioned outside the communication range of 5G (OP12: NO), the process progresses to OP15.

In OP13, the controller 12 determines whether or not the safety condition is satisfied based on information relating to the driving status of the vehicle 20. When the safety condition is satisfied (OP13: YES), the process progresses to OP14. When the safety condition is not satisfied (OP13: NO), the process progresses to OP15.

In OP14, since the in-vehicle device 2 is positioned within the communication range of 5G, and the safety condition is satisfied, the controller 12 acquires rich data of the content of the target from the content DB 14 and transmits rich data to the in-vehicle device 2. In this case, since the in-vehicle device 2 is positioned within the communication range of 5G, there is a high possibility that rich data of the content is received through wireless communication of 5G. Thereafter, the processing shown in FIG. 6 ends.

In OP15, since the in-vehicle device 2 is not positioned within the communication range of 5G or the safety condition is not satisfied, the controller 12 acquires lean data of the content of the target from the content DB 14 and transmits lean data to the in-vehicle device 2. When the in-vehicle device 2 is positioned within the communication range of 5G, there is a high possibility that the in-vehicle device 2 receives lean data of the content through wireless communication of 5G, and when the in-vehicle device 2 is positioned outside the communication range of 5G, there is a high possibility that the in-vehicle device 2 receives lean data through wireless communication (for example, 4G) usable at a current position. Thereafter, the processing shown in FIG. 6 ends.

Advantageous Effects of First Embodiment

In the first embodiment, rich data or lean data of a target content is transmitted to the in-vehicle device 2 according to whether or not the in-vehicle device 2 is positioned within the communication range of 5G. For example, rich data is transmitted when the in-vehicle device 2 is positioned within the communication range of 5G, and lean data is transmitted when the in-vehicle device 2 is positioned outside the communication range of 5G. For example, when rich data is transmitted through wireless communication having a speed lower than 5G, time is needed until the transmission is completed, or communication may be interrupted due to withdrawal from the communication range of 5G in the middle of transmission. However, according to the first embodiment, when solely wireless communication having a speed lower than 5G is usable, lean data is transmitted, and thus, it is possible to suppress interruption or excessive time taken until the transmission is completed, and to provide stable communication.

In the first embodiment, when the driving status of the vehicle 20 in which the in-vehicle device 2 is mounted does not satisfy the safety condition, even though the in-vehicle device 2 is within the communication range of 5G, lean data is transmitted to the in-vehicle device 2. Between rich data and lean data, rich data has more modifiers, and thus, easily attracts user's attention. For example, when the user is moving, there is a possibility that the user pays attention to content data and is exposed to danger. According to the first embodiment, when the safety condition is not satisfied, lean data is transmitted, and thus, it is possible to suppress concentration of attention on content data, and to secure the safety of the user during moving.

Other Embodiments

The above-described embodiment is just an example, and the disclosure may be appropriately modified and carried out without departing from the spirit and scope of the disclosure.

In the first embodiment, the center server 1 has the field intensity map, and the center server 1 determines which of rich data and lean data of the content relating to the target is transmitted to the in-vehicle device 2. However, the disclosure is not limited thereto, and for example, the in-vehicle device 2 may have the field intensity map, the center server 1 may decide which of rich data and lean data of the content relating to the target is to be acquired, and either of rich data or lean data of the content relating to the target may be requested to the center server 1.

In the first embodiment, although the in-vehicle device 2 has been described as an example, the processing of the in-vehicle device 2 in the first embodiment can be applied to, for example, walking with a smartphone, a tablet terminal, a wearable terminal, or the like.

In the first embodiment, although rich data or lean data is transmitted according to whether or not the in-vehicle device 2 is positioned within the communication range of 5G, the disclosure is not limited thereto. For example, distribution of content data in multiple steps may be made such that one of rich data, first lean data, and second lean data is transmitted according to whether the in-vehicle device 2 is positioned within a communication range of one of 5G, 4G, and 3G. The data size and the number of modifiers have a relationship of rich data>first lean data>second lean data.

The processing or units described in the present disclosure can be freely combined and implemented as long as no technical contradiction arises.

Processing described to be executed by one device may be shared and executed by a plurality of devices. Alternatively, processing described to be executed by different devices may be executed by one device. In a computer system, a hardware configuration (server configuration) that implements each function may be flexibly changed.

The disclosure may also be implemented by supplying a computer program mounted with the functions described in the above-described embodiments to a computer and causing one or more processors in the computer to read and execute the program. Such a computer program may be provided to the computer by a non-transitory computer-readable storage medium connectable to a system bus of the computer or may be provided to the computer through a network. The non-transitory computer-readable storage medium includes, for example, any type of disk, such as a magnetic disk (a Floppy (Registered Trademark) disk, a hard disk drive (HDD), or the like), or an optical disk (a CD-ROM, a DVD, a Blu-ray disc, or the like), a read only memory (ROM), a random access memory (RAM), an EPROM, an EEPROM, a magnetic card, a flash memory, an optical card, or any type of medium suitable for storing electronic instructions.

What is claimed is:

1. An information processing device comprising a controller configured to:
   acquire information relating to a current position of a terminal from the terminal,
   transmit first content data to the terminal when the current position of the terminal is within a communication range of first wireless communication, and
   transmit second content data, which has a data size transmittable within a predetermined time even though second wireless communication having a speed lower than the first wireless communication is used, transfers information with the same effect as a content of the first content data, and is different in transfer method of the content from the first content data, to the terminal when the current position of the terminal is outside the communication range of the first wireless communication.

2. The information processing device according to claim 1, wherein the controller is configured to transmit the first content data to the terminal when the terminal is positioned within the communication range of the first wireless communication and a safety condition is satisfied.

3. The information processing device according to claim 2, wherein the safety condition includes a condition that the terminal is not moving or a condition that a vehicle, in which the terminal is mounted, is during autonomous driving.

4. The information processing device according to claim 1, wherein:
   the first content data is moving image data; and
   the second content data is still image data.

5. An information processing method comprising:
   acquiring information relating to a current position of a terminal from the terminal;
   transmitting first content data to the terminal when the current position of the terminal is within a communication range of first wireless communication; and
   transmitting second content data, which has a data size transmittable within a predetermined time even though second wireless communication having a speed lower than the first wireless communication is used, transfers information with the same effect as a content of the first content data, and is different in transfer method of the content from the first content data, to the terminal when the current position of the terminal is outside the communication range of the first wireless communication.

* * * * *